Dec. 20, 1966 T. JANKOVICH 3,293,635

CONVERTER SYSTEM

Filed March 14, 1963 2 Sheets-Sheet 1

INVENTOR

TIBOR JANKOVICH

BY Paris, Haskell & Levine

ATTORNEYS

Dec. 20, 1966 T. JANKOVICH 3,293,635

CONVERTER SYSTEM

Filed March 14, 1963 2 Sheets-Sheet 2

INVENTOR
TIBOR JANKOVICH

BY Paris, Haskell and Levine

ATTORNEYS

United States Patent Office 3,293,635

Patented Dec. 20, 1966

3,293,635
CONVERTER SYSTEM

Tibor Jankovich, Jenkintown, Pa., assignor, by mesne assignments, to United Aircraft Corporation, a corporation of Delaware Filed Mar. 14, 1963, Ser. No. 265,227
10 Claims. (Cl. 340—347)

This invention generally relates to systems for encoding and decoding information reversibly from analog to digital form and more particularly to such systems for performing these functions at either low or very high rates of speed, measured in nanoseconds, and being useful for many applications including digital voice communication systems.

It is accordingly a principal object of the invention to provide digital-analog converter systems capable of operation at such high speeds as to approximate the maximum speed of operation of available solid state components, such as transistors, diodes, and the like.

A further object is to provide such systems that may be operated at lower rates of speed and in which the speed of operation may be controllably varied as desired.

Still another object of the invention is to provide such systems having a minimum number of components, preferably all of which are solid state components enabling the converter systems to be packaged in very small and light weight sizes, and requiring very low power consumption.

Still another object is to provide a digital encoding and decoding system capable of a very high rate of data transmission, and useful among other applications for transmitting a very large number of voice conversations on a time sharing basis over a single channel.

A further object is to provide a combined digital encoder and decoder using the same components and that may be selectively converted from one function to that of the other.

Still further objects of the present invention are to provide such systems in which the number of digits or bits may be reduced or extended as desired without extensive changes in the system.

Figures 1, 2, 4:
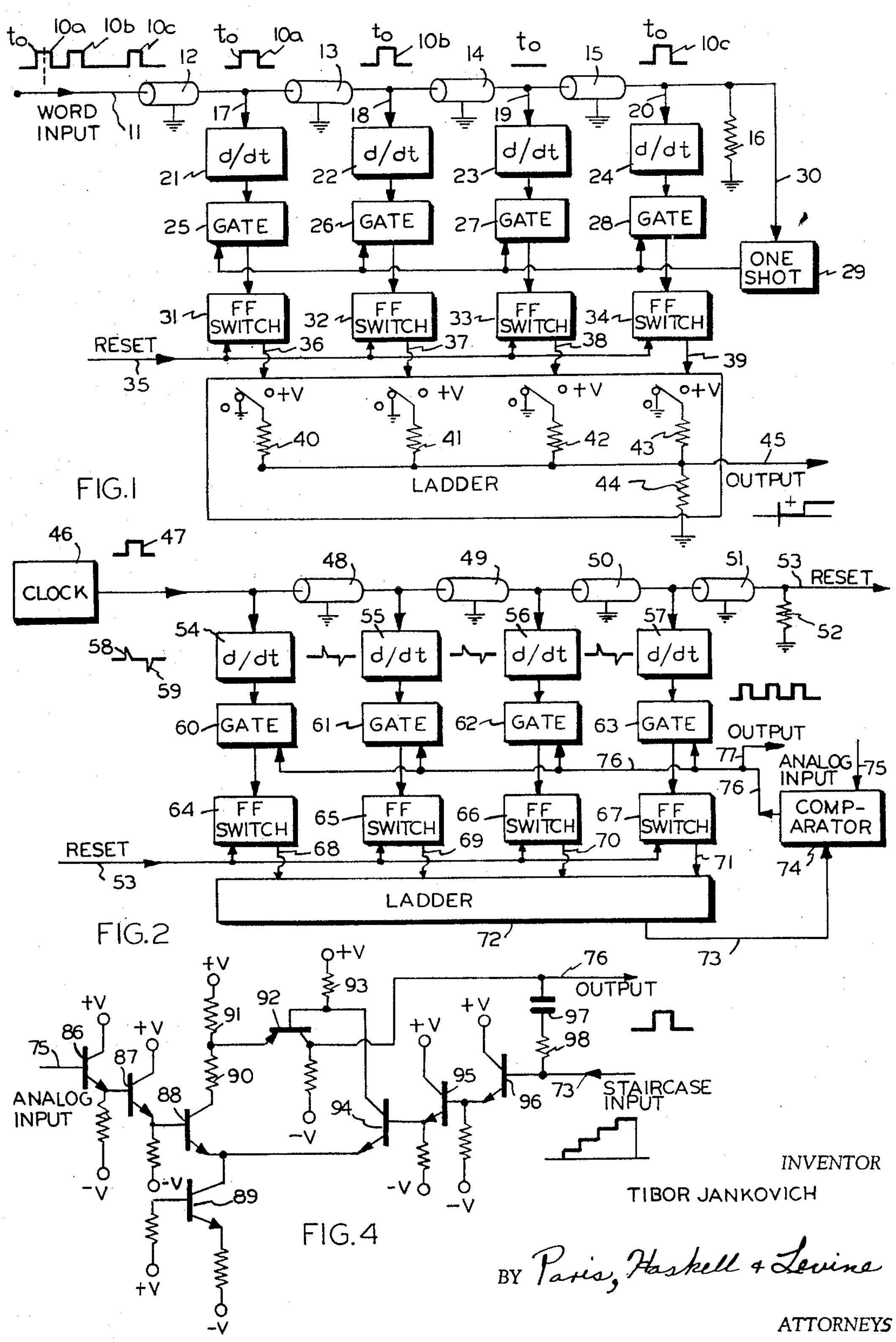
Figures 3, 5, 6, 6A, 7:
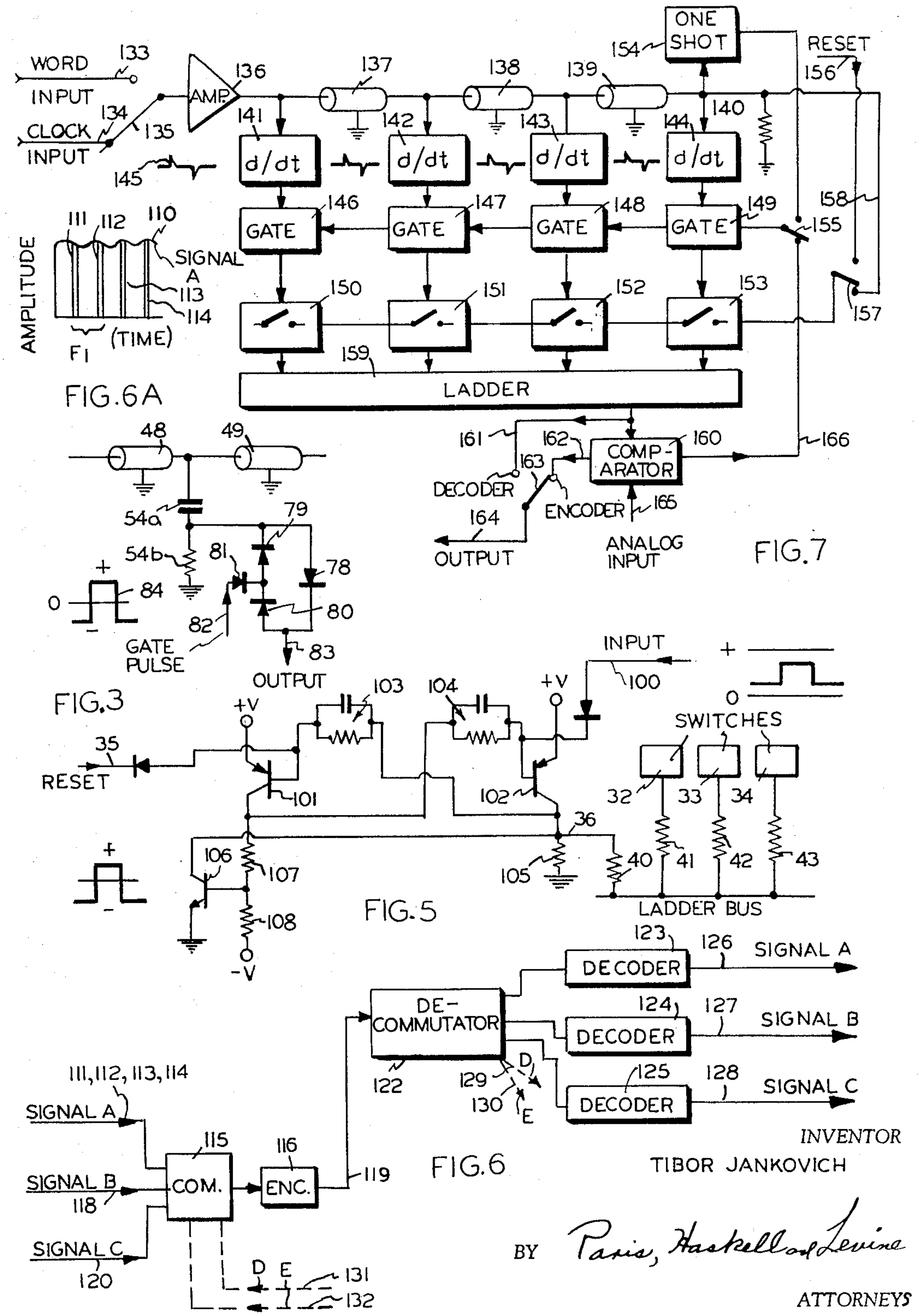

Other objects and many additional advantages will be more readily understood by those skilled in the art after a detailed consideration of the following specification taken with the accompanying drawing, wherein:

FIG. 1 is an electrical block diagram illustrating one preferred decoder circuit according to the present invention, FIG. 2 is an electrical block diagram similar to FIG. 1, and illustrating one preferred encoder circuit according to the invention, FIG. 3 is an electrical schematic diagram illustrating a preferred differentiating circuit and gate circuit that may be employed in the circuit of FIG. 2, FIG. 4 is an electrical schematic illustration of a preferred comparator circuit for the encoder system of FIG. 2.

FIG. 5 is an electrical schematic illustration of a preferred flip-flop switching mechanism and resistor ladder network that may be employed in the decoder or encoder circuits of FIGS. 1 and 2, FIG. 6 is an electrical block diagram depicting the use of the encoder and decoder circuits of FIGS. 1 and 2 for the digital transmission of a large number of voice conversations on a time sharing basis according to the present invention, FIG. 6*a* is an electrical wave form diagram for illustrating the operation of the digital voice communication system of FIG. 6, and FIG. 7 is an electrical block diagram, similar to FIGS. 1 and 2, and illustrating a combined encoder-decoder circuit utilizing the same components and that may be selectively converted to perform either the decoding or encoding function, as desired.

Very generally according to the present invention, there is provided a staircase or step wave generator capable of producing a progressively increasing electrical signal, in incremental steps, for reproducing or synthesizing an analog signal, together with a novel time delay actuator and control circuitry for operating the staircase generator in different modes of operation to perform either the encoding or decoding functions. For the encoding mode of operation, the time delay actuator is employed to sequentially energize the stepwave generator in an automatically recurring manner to successively approximate an analog signal that it is desired to reproduce in digital form. As each step of the staircase wave is produced a comparison is made with the analog signal and this step increase is either retained or withdrawn depending upon whether the resulting amplitude exceeds or is less than the analog signal. Thus during the encoding operation, the staircase generator is successively actuated to simulate the analog signal by a series of approximations and when its automatic cycle of operations is completed, and the analog signal is successively simulated, a digital code corresponding to the analog signal has been obtained.

In the decoding mode of operation, an identical staircase generator is preferably employed together with an identically automatically operating time delay means. However, in this case, the incoming digital signal to be converted is applied to the time delay means which in this case functions to simultaneously actuate the staircase generator according to the different digits in the incoming signals thereby to simultaneously reproduce the digital signal in analog form.

According to a preferred embodiment of the invention, the staircase generator is preferably constructed of a resistance ladder that is capable of rapidly producing staircase waveforms, and the time delay actuator is preferably comprised of a multiple section delay time capable of producing very short time delays, measured in nanoseconds. These components together with a minimum number of auxiliary solid state switches and other solid state components enable the conversion of a digital signal into analog form or the reverse to be performed in nanosecond intervals, so that on a time sharing basis many different message data may be encoded, digitally transmitting over a single channel and decoded at a receiver.

Referring now to the drawings for a detailed consideration of preferred embodiments employing the invention, there is shown in FIG. 1 a preferred decoder circuit for converting a four digit binary word into an analog signal. This circuit generally comprises a staircase or step waveform generator, consisting of a resistance ladder having four resistors 40, 41, 42, and 43, a multisection delay line units 12, 13, 14 and 15, and a series of control circuits interposed between the delay line sections and the resistance ladder for interconnecting the various output sections of the delay line units to the resistance ladder.

As shown, the ladder network resistors 40, 41, 42, and 43 all have one terminal connected in common to an output line 45, and each have the opposite terminal thereof being connected to a switch which selectively applies a positive voltage or zero voltage to this opposite terminal. To produce a binary weighted staircase waveform as desired, the values of the resistors 40 to 43, are binary weighted; that is, the resistor 41 has twice the value of resistor 40, the resistor 42 has four times the value of resistor 40, and the resistor 43 has eight times the value of resistor 40.

With this arrangement, when the first resistor 40 is switched to receive a positive voltage a first signal level voltage appears across the output line 45, and the amplitude of this first signal corresponds to the first digit of a binary number. When the second resistor 41 is switched to receive a positive voltage, the resistors 40 and 41 are both connected in parallel and the amplitude of voltage on output line 45 is increased by one step corresponding to the sum of the first and second binary digits. Similarly, when the third resistor 42 is switched to receive positive voltage, the output 45 again increases to the next analog level of the staircase waveform thereby to simulate or reproduce the sum of the first three digits. Since each of these resistors is provided with an individual switch, the analog signal over line 45, may be made to represent any one of the digital numbers 1 to 16, which is within the capability of a four digit binary system. Moreover, by the addition of more binary weighted resistors to the ladder network (not shown) the system may be extended to five or more digits, as desired.

In the decoding operation, the serial binary pulse code to be converted into analog form, and comprising a time series of pulses 10, 10*b*, and 10*c* is introduced over the input line 11 to the multisection delay line 12, 13, 14 and 15, and each pulse travels in the same order, as in the word, down the delay line sections. As is conventional in serial binary terminology, the presence or absence of a pulse in each position of the binary word signifies whether a zero or one is present for that digit, and accordingly the binary word 10*a*, 10*b*, and 10*c* as shown in FIG. 1, corresponds to the binary number 1101, equal to the decimal number 13. When the first pulse 10*c* of this serial train completely passes through the delay line sections and appears at the matched terminating resistor 16, it then passes over output line 30 and triggers a one-shot multivibrator circuit 29 into operation. The one-shot multivibrator 29 produces a control pulse that is applied to all of a series of gate circuits 25, 26, 27 and 29, as shown, thereby closing all of these gate circuits simultaneously.

In the meanwhile, when the first pulse of this serial code has reached the terminating resistance 16, the other pulses of this code, including pulses 10*a* and 10*b*, also appear simultaneously at the output of each of the other delay line sections corresponding to their position in the code. Thus, the pulse 10 appears at the output of the first delay line section 12 and is transmitted over line 17, and the remaining pulse 10*b* appears as the output of the delay line section 13 and is transmitted over line 18.

At each of the output lines 17, 18, 19 and 20 leading from the different delay line sections, there is provided differentiating circuits 21, 22, 23 and 24, respectively, which serve to differentiate the pulses appearing at the lines 17, 18, 19 and 20, respectively, and to transmit the differentiated pulses to the gate circuits 25, 26, 27, and 28, as shown.

These gate circuits 25 to 28, are normally open such that no one of these differentiated pulses passes through the gates until all of the pulses 10*a*, 10*b* and 10*c* are properly aligned as shown, whereupon the pulses 10*c* triggers the one-shot multivibrator 29 into operation to simultaneously close the gates and pass these differentiated pulses.

As thus far described, therefore, the multisection delay lines 12, 13, 14 and 15 together with the one-shot multivibrator and gate circuits, provide a means for separating the serially received digital pulse code, 10*a*, 10*b* and 10, into a plurality of different channels, over lines 17, 18, 19 and 20, with each channel corresponding to a different digital order of the binary number.

Leading from the outputs of each of the gate circuits 25 to 28, inclusive, there is provided a separate switching means 31 to 34, inclusive, having output lines 36 to 39, inclusive, which are connected to selectively apply a positive voltage to the different resistors 40 to 43 of the resistance ladder. Consequently, if switch 31 is actuated upon the closing of the related gate 25, a positive potential is applied to resistor 40 and thereby creates the first level analog signal over output line 45. Similarly if any or all of the switches 32, 33 and 34 are triggered into operation upon the closing of their respective gates, the resistors 41 to 43, inclusive, each connected to a different one of the switches is similarly switched to receive a positive voltage and to apply its increment of output voltage over output line 45.

Since the original serial digital word has been separated into its different channels or digital orders by means of the multisection delay line only those various ones of the switches 31 to 34 are actuated upon the closing of the gate circuits 25 to 28, corresponding to the digits in the received binary code, 10*a*, 10*b*, and 10*c*, and thereby selectively energize only resistors 40, 41 and 43 of the ladder to create an output voltage on line 45, corresponding to the analog equivalent of the binary pulse code.

The one-shot multivibrator circuit 29 is preferably provided with a sufficiently delayed recovery time, so that it can operated only once in response to each binary word applied to the input 11. Consequently, the multivibrator will be placed in operation only by the first pulse 10*c* of the serial code that reaches the output line 30 leading to the one-shot multivibrator 29. For this reason, the gates 25 to 28, inclusive, are closed only once during the reception of each binary word to produce the analog output voltage over line 45.

The switches 31 to 34, inclusive, are preferably bistability state flip-flop circuits, as will be subsequently described, and therefore will remain in the closed position, determined by the binary word, until a reset pulse is received over line 35 to restore each of those switches to its original position, thereby resetting the energized ones of the resistors 40 to 43 of the ladder to a zero energized condition.

Thus, according to a preferred embodiment of the decoder circuit, the multisection delay lines 12, 13, 14, and 15 together with the one-shot multivibrator 29, and the gate circuits operate to separate the serially received binary code word into the various binary orders of the number, and simultaneously to actuate the resistance ladder to produce the equivalent analog output signal over output line 45.

As will be subsequently described, the differentiating circuits such as 21, the gate circuits, such as 25, and the switching circuits such as 31, are all preferably solid state circuits comprised of diodes and transistors having an extremely fast time of operation. The delay line sections 12 to 15, are also separated by one another in time by very short time delay intervals, in the order of nanoseconds. For this reason the conversion of each serial binary word into an analog voltage at the output 45 is performed extremely rapidly, and the decoder system is capable of translating a very great number of binary words, in sequence, during each second of time.

FIG. 2 illustrates a preferred encoder circuit according to the present invention, and as will be noted contains circuits in common with that of the decoder circuit. As shown, the preferred encoder circuit includes a ladder network which may be identical to that shown in FIG. 1; a multisection delay line, comprising sections 48, 49, 50 and 51, which may also be identical to that describe above; a plurality of differentiating circuits 54 to 57; gate circuits 60 to 63, inclusive; and flip-ffop circuits 64 to 67, inclusive, all similar to or identical to those described above.

As contrasted with the decoder circuit, however, the encoder circuit functions in a sequential manner rather than simultaneously and converts an analog input signal into digital code form by performing a successive series of approximations.

Referring to FIG. 2, the analog input signal is applied over line 75 to a comparator circuit 74 where it is compared with a series of different amplitude voltages being successively produced by the ladder 72 or staircase generator. The ladder 72 is adapted to be successively operated to produce these different levels by means of a timing control being provided by the multisection delay lines 48, 49, 50 and 51. As each different amplitude voltage is produced in succession by the ladder 72, a comparison of this different level with the amplitude of the analog signal is made by the comparator circuit 74, and this level is either retained or rejected depending upon whether it is contained in the analog signal. Consequently, after the series of successive approximations has been completed, the different digits contained in the analog signal are obtained and a digital pulse code corresponding to the analog signal is produced over output line 77 leading from the comparator circuit 74.

For sequentially actuating the ladder network in this manner, there is provided a pulse generator or clock 46 which serves as a timing source for producing a regular series of equally time spaced pulses to the input of the multisection delay lines 48, 49, 50 and 51. As will be subsequently explained, each pulse produced by the clock generator initiates a complete cycle of operations or in other words, controls the conversion of the analog signal into a pulse code. Consequently, for permitting a variable number of encoding or converting operations to be performed during each second as desired for different applications, the clock source 46 is preferably an adjustable frequency oscillator.

Considering the detailed operation of this circuit, each clock pulse 47 is directed to the input of the delay line initially passes over the first channel to the differentiating circuit 54 which operates to differentiate the leading edge of this pulse 47 and produce a positive spike 58, and shortly thereafter differentiates the trailing edge of this clock pulse to produce a negative spike 59. In the encoder, the gates, such as gate 60, are normally closed to pass positive pulses, such that the positive spike 58 may pass through the gate 60 and operate the first channel flip-flop switch 64, thereby to produce at the output of the ladder network 72, a first level analog voltage over line 73. This first level voltage is directed backwardly to the comparator circuit 74 where it is compared with the amplitude of the analog input signal over line 75. If this first level signal from the ladder network 72 exceeds the analog input signal in amplitude, it is known that the first digit or order of the binary number is not contained in the analog input signal and therefore, the comparator 74 produces a voltage over line 75 to close the gate circuit 60 and permit the delayed negative going trigger or spike 59 to pass through and reset flip-flop switch 64 to its original condition. When the flip-flop switch 64 is returned to its initial condition, it removes the energization of the first resistor from the ladder and therefore restores the ladder voltage amplitude over line 73 to its original value.

In the event that the first level output signal from the ladder 72 and directed over line 73 is less in amplitude than the analog input signal 75, the comparator 74 does not produce the control pulse over line 76 and the gate 60 remains open to negative pulses and does not permit the delayed negative going spike 59 to pass therethrough. In this case, the flip-flop switch 64 remains in its "on" position to continue the energization of the first resistance in the ladder, and continues the first level voltage on line 73, indicating that the first digit of the binary number is contained within the analog input signal.

After a very short time delay, the same clock pulse 47 then appears at the output of the first delay line section 48 and is directed through differentiating circuit 55 to produce the positive and negative triggers at the input of the second channel. As before, the positive going trigger pulse at the leading edge of the clock pulse passes through the second gate 61 which is normally closed to always pass positive pulses but is normally open to prevent the passage of negative pulses. This positive trigger pulse then actuates the second flip-flop switch 65, which in turn energizes the second resistance of the ladder to produce a second level voltage at the ladder output line 73, leading to the comparator circuit 74. Again, if the second voltage level is greater than the amplitude of the analog input signal, the comparator 74 produces a control voltage over line 76, which enables the negative going differentiated trigger pulse to pass through the gate 61 and reset the flip-flop switch 65, thereby removing the second level voltage from the ladder output signal over line 73 and returning the ladder output line to its first level. However, if the second level is less than the amplitude of the analog input signal, this operation does not take place so that the output of the ladder at line 73 remains at the second step of the staircase wave.

After a second time delay provided by delay line section 49, the same clock pulse 47 then emerges from the second section 49 of the delay line, is differentiated by the differentiator circuit 56 in the third channel, and performs the same series of operations, as described above, to either add or remove the third level of the staircase wave depending upon whether the third level is greater than or less than the amplitude of the analog input signal.

Thus, in this manner, the same clock pulse successively passes through each section of the delay line and successively operates each channel of the encoder, whereby when it appears at the matched terminating resistance 52 at the output of the last delay line, all channels have been actuated and the resulting output signal from the ladder 73 corresponds to a close approximation of the amplitude of the analog input signal 75.

Thus the encoder circuit functions automatically in response to each clock pulse 47 produced by the clock generator 46, to successively produce a staircase waveform and compare each step of the staircase wave with the amplitude of the incoming analog signal and either accept or reject that step depending upon whether that order of the digital number is contained within the analog input signal. After that clock pulse has completely traversed all of the sections of the delay line, the series of successive approximations is completed and the input analog signal over line 75 has been approximated by the output voltage on line 73.

It will be noted that as each comparison is made in this series of successive approximations, the comparator circuit 74 produces a control voltage impulse over line 76, which is an indication of whether that order of the digital number is or is not contained within the analog input signal. Consequently, these control impulses constitute the serial binary code output corresponding to the analog input signal and are directed over line 77 to provide the digital output of the encoder circuit. For a parallel output reading, it is merely necessary to sample, in parallel, the one-off condition of the flip-flop switches 64 to 67, after each cycle of operations has been completed.

In the encoder circuit of FIG. 2, the passage of each clock pulse completely through the delay line sections signifies the end of the analog-to-digital conversion operations. Consequently, when each clock pulse appears at the matched terminating resistor 52, it is then directed over reset line 53 and back to all of the flip-flop switches 64 to 67, inclusive, to reset or recondition each of these flip-flops to its initial condition.

Thus, this encoder circuit is automatically reset after each conversion operation and will automatically and continually convert a time variable analog input signal at 75 into a continual series of binary words on output 77 at a rate controlled by the frequency of the clock generator 46. As discussed above in connection with the circuit of FIG. 1, all of the components of this circuit are capable of extremely rapid operation, in the order of nanoseconds, and therefore by operating the clock generator 46 at kilocycle frequencies or higher rates, the encoder may almost continuously convert time variable analog signals into digital pulse form.

FIG. 3 illustrates circuit details of one preferred differentiating circuit and gate circuit, such as 55 and 61 as described in FIG. 2. As shown, the differentiating circuit 55 may be comprised solely of a series connected capacitor 54*a* and resistor 54*b* being connected at the input of the second delay line section 49, with the differentiated pulses appearing at the junction of the capacitor and resistor as is known to those skilled in the art.

The gate circuit 61 for enabling the positive differentiated pulses to always pass through, but selectively switching the negative pulses, is comprised of four solid state miniature diodes 78, 79, 80 and 81, as shown. The diode 78 is forwardly poled and is directedly connected between the differentiator circuit junction and the output line 83 which leads to the flip-flop switch 65. Thus, any positive going trigger passes through the diode 78 to the flip-flop switch 65 as described above. To render the gate circuit normally open with respect to negative pulses, the two diodes 79 and 80 are reversely poled between the differentiator circuit and the output line 83 as shown, but the junction of these diodes is connected by a fourth diode 81 to a control line 82 that can receive either a positive or a negative potential level in the form of a pulse (pulse 84 shown). When the control voltage 84 applied over line 82 is at a positive potential the negative trigger from the differentiator passes through the diode 79 and diode 80 and is by-passed from passing to the output line 83. In this condition, the gate is normally open and will not pass negative triggers. On the other hand, when the control line 82 is energized by a negative control potential 84, the diode 81 is improperly biased and will not pass current, whereby a negative trigger from the differentiating circuit passes through the diodes 79 and 80 to the output line 83 leading to the flip-flop switch. Thus, by selectively energizing the gate circuit by either a negative or positive potential on the control line 82, the gate circuit may be selectively opened or closed to negative going triggers yet always permit the passage of positive going triggers, all as described above in connection with FIG. 2.

For modifying this circuit to provide the gating of both positive and negative pulses, as described above in connection with FIG. 1, the diode 78 in the positive section of the gate may be replaced by a pair of diodes (not shown), with both being positively poled as is diode 78, and being biased by a third diode (not shown) at the junction thereof in the same manner but in opposite polarity to diodes 81 and 80.

FIG. 4 illustrates one preferred comparator circuit 74 of FIG. 2. As indicated above, the comparator circuit 74 is energized by a staircase ladder signal on the line 73, and functions to compare this signal with the analog input signal to produce a pulse over 76 whenever the ladder signal exceeds the analog input signal. According to the present invention this circuit is preferably a slightly modified differential amplifier as is shown in FIG. 4.

As shown, the circuit is essentially a differential amplifier wherein the analog signal is directed to an input 75 line on one side of the differential amplifier, the staircase waveform from the ladder network 72 is directed to the opposite input line 73, and the output or difference signal is obtained over line 76. The analog input signal on line 75 is initially directed through three transistors 86, 87 and 88 connected in an emitter follower circuit to provide a very high input impedance to the analog signal, and to effectively decouple the analog signal impedance from the comparator impedance. The staircase waveform obtained from the ladder circuit and being directed to the other input line 73 is also directed through emitter follower connected stages comprising transistors 94, 95 and 96. The emitter electrodes of transistors 88 and 94 are in turn connected to a constant current device, comprising a transistor 89 in series with a resistor. To insure a rapid changeover of the output control signal 76 when the analog input signal exceeds the amplitude of the staircase input signal, there is provided a switching transistor 92 having its base and emitter electrodes connected between the collector electrodes of transistors 88 and 94. With this connection, when the potential or amplitude level of the analog input signal on line 75 exceeds the amplitude of the staircase input level, the transistor 92 is switched to a conductive condition, to provide a pulse output on line 76.

More specifically, the emitter of transistor 92 is connected to the junction of resistors 90 and 91 in the collector circuit of transistor 88, and the base of transistor 92 is connected to the junction of resistor 93 and the collector of transistor 94. Consequently, the transistor 92 is switched to conducting condition when the potential at the collector electrode of transistor 88 exceeds the potential at the collector electrode of transistor 94, and this occurs whenever the amplitude of the staircase wave is greater than that of the analog signal. When the transistor 92 conducts, current flows through the resistor connected in its collector circuit thereof to produce a positive pulse over the output line 76. To rapidly switch the transistor 92 to nonconduction after this positive output pulse is produced, there is provided a positive feedback between the output line 76 and the input line 73 receiving the staircase waveform, and being provided by a capacitor 97 in series with resistor 92. In this positive feedback connection, the capacitor 97 rapidly charges to apply a negative bias to transistor 96 which thereupon is directed to extinguish the transistor 92 rapidly and return the output line 76 to its original level as desired in readiness for the next comparison step.

FIG. 5 illustrates a preferred flip-flop switching circuit corresponding to that shown as block 64 in FIG. 2. As previously indicated, this switching circuit responds to positive going pulses to reverse the stability state and energize a ladder resistance, and is reset by a negative going pulse to deenergize the ladder resistor. Referring to FIG. 5, is will be noted that the circuit generally comprises a pair of transistors 101 and 102 interconnected in feedback with one another through resistor-capacitor feedback circuits 103 and 104 in a manner somewhat conventional in flip-flop circuits. At the collector electrode of transistor 102, there is an electrical connection 36 being made to one of the resistors 40 of the ladder network. Consequently, when the voltage level at line 36 is rendered more positive, in one condition of the flip-flop circuit, the ladder resistor 40 is energized with a positive potential, whereas when the voltage level on line 36 is dropped to zero (or ground level), the ladder resistor 40 is switched off. The incominig signal to the flip-flop circuit is directed over line 100 and through a diode to the base electrode of transistor 102, and the reset circuit for restoring the original stability state of the flip-flop is directed over line 35 and through a diode to the base electrode of transistor 101. A positive impulse over line 100, therefore, operates to render the transistor 102 conducting and transistor 101 nonconducting thereby passing current flow through resistor 102 and applying a positive potential to the ladder resistor 40. As a result, a first level of amplitude is produced at the ladder bus or output. When the condition of the flip-flop is reversed, and transistor 101 is rendered conductive and transistor 102 is rendered nonconductive, the current flow through resistor 105 is cut off and a zero or ground potential is applied to the ladder resistor 40.

To insure that the voltage level on line 36 drops to ground or zero level despite a small residual current flow through resistor 105, there is provided an additional shorting transistor 106 connected in parallel with resistor 105, as shown. The base electrode of transistor 106 is connected to the junction of resistors 107 and 108 and consequently, when the flip-flop is reset and current flows through transistor 101, the transistor 106 is also rendered conducting by the voltage drop across resistor 108, to short circuit the resistor 105 and apply a ground level potential to the ladder resistor 40, as desired. Thus, by this simple modification of the flip-flop circuit, it serves to rapidly connect the resistor 40 to either a positive potential for generating a given staircase level, or alternatively to directly connect this resistor to ground, all depending on the "on" or "off" condition of the flip-flop switch.

As generally discussed above, the described encoder and decoder circuits are capable of extremely rapid operation, measured in nanoseconds, and therefore are capable of encoding and decoding a large number of data signals, such as voice communication, over a single channel on a time-sharing basis. FIG. 6 illustrates one system for performing this function and FIG. 6A illustrates a typical analog data signal. As generally shown in FIG. 6A, a time varying analog signal, such as a voice signal 110 may have its varying amplitude sampled, as indicated at times 111, 112, 113 and 114, on a regularly recurring basis, and each of these sampled amplitudes may be converted into a digital pulse code which is transmitted over a communication channel and later decoded at the receiver. If the conversion of each sampled amplitude is performed in nanoseconds, this conversion is substantially instantaneous and may be rapidly performed at regular intervals, at kilocycles or higher frequencies, to accurately reproduce the intelligence. In the interval between the successive sampling of this signal 110, many other voice signals may also be sampled in time sequence and in a regular recurring order, so that many thousands of voice signals may be sampled in sequence and converted into a digital code, and the digital code transmitted over a single communication channel.

One such system is illustrated in FIG. 6, wherein three independently varying data signals A, signal B, and signal C, are each directed to a sampling commutator 115 where these signals are sequentially connected in time sequence, one at a time, to an encoder circuit 116 similar to that of FIG. 2. The encoder 116 converts each of the sampled amplitudes into digital pulse code form and these codes are then directed over a common communication channel 119, which may be a wire cable or radio frequency transmission path, as might be desired. At the receiver end of this common communication channel 119, there is provided a suitable decommutator 122 that is maintained in synchronism, with commutator 115 and operates to switch each incoming digital code word to the proper one of the decoders 123, 124 and 125. Since the decoders may function at nanosecond speeds, the sampled amplitudes of signals A, B, and C are periodically reproduced at the same rate of speed as in the sampling, for example, at 10 kilocycles or higher, depending upon the number of messages transmitted over the common communication channel 119. Thus, due to the fact that the encoding and decoding of the signals can be performed at such a high rate of speed as to be practically instantaneous, a vast number of individual data messages may be transmitted on a time-sharing basis over a single channel as generally indicated by the additional dotted lines 131 and 132 at the transmission end and the dotted lines 129 and 130 at the reception end, as desired.

Due to the fact that most of the components of the preferred encoder and decoder circuits are identical, a combined encoder and decoder system may be provided that can be selectively perform either the encoding or decoding functions, and that may be switched from one function to the other for either transmission or reception. One preferred circuit for performing this combined function is illustrated in FIG. 7.

Referring to FIG. 7 for an understanding one combined decoder-encoder current according to the invention, it is initially noted that the circuit is substantially identical to the encoder circuit of FIG. 2, with the addition of only a one-shot multivibrator 154, as required for decoding, and four switches 135, 155, 157 and 163 for selectively converting the circuit from encoding to decoding operation or the reverse. The switches 135, 155, 157 and 163 are preferably all mechanically interconnected together, or ganged (not shown), so that the circuit may be selectively converted to perform either function by the actuation of a single mechanical or electrical switch mechanism.

As shown in FIG. 7, the switches 135, 155, 157 and 163 are electrically interconnected in the position for performing the encoding operation, and when in this position, it is seen that the circuit is identical with the encoder circuit of FIG. 2. More specifically, the analog input signal is applied over line 165 leading to the comparator 160, and is there compared with the step-wave or staircase voltage output from the ladder network 159. A clock input pulse source is interconnected by means of switch 135 to apply pulses to the multisection delay line 137, 138 and 193 and in passing through each section thereof in time delayed relationship operates to successively actuate each digital channel, thereupon successively actuating the ladder 159 to produce each step or voltage level of a staircase wave. These steps are each compared with the amplitude of the analog input signal in the comparator circuit 160 and are accepted if less or rejected, if greater than the analog signal. The comparator produces pulses over line 166 which pass through switch 155 and control the gate circuits 146 to 149, respectively, to both close the gates for passage of the negative triggers and provide the output pulses as discussed above.

For automatically resetting the flip-flop switches after each encoding operation, each of the same clock pulse after energizing the last section 139 of the delay line, passes downwardly over line 158 and through switch 157 to reset all of the flip-flop switches 150 to 153, inclusive.

For the encoding operation, the one-shot multivibrator 154 is disconnected from the circuit by switch 155, as well as the external reset line 156 by means of switch 157.

When it is desired to convert the circuit for decoder operation, all of the switches 135, 155, 157 and 163 are actuated to their opposite contacts. In this position the switch 135 connects the word input or pulse code source to the input of the delay line; the switch 155 interconnects the one-shot multivibrator 154 to commonly energize the gate circuits and disconnects the comparator circuit 110; the switch 157 interconnects an external reset line 156 to the flip-flop switches, and finally the switch 163 connects the output line 169 to the output of the ladder network rather than to the comparator 160.

By comparing this circuit, with the selector switches in this opposite position, with FIG. 1, it will be noted that it is identical with that of the decoder circuit of FIG. 1, and accordingly a further description of the decoding operation is not considered necessary.

It is noted that in the circuit of FIG. 7, an amplifier buffer circuit 136 is employed at the input to the multisection delay line 137, 138 and 139 whereas none is shown in the circuits of FIG. 1 or FIG. 2. The use of this amplifier-buffer is a matter of choice depending upon the level or amplitude of pulses available to be fed to the delay line and the need for impedance matching the line to the external source of clock pulses or word pulse code source.

It is also noted that the gate circuits 146 to 149, inclusive, function somewhat differently in the decoder arrangement from the encoder arrangement; namely, in the decoder arrangement the gates are normally open for positive pulses and are actuated to closed position upon energization by the one-shot multivibrator whereas in the encoder arrangement, the gates are always closed for positive impulses and normally open for negative impulses and are actuated to closed position to pass negative impulses upon energization by the comparator circuit. However, as explained above in connection with FIG. 3, similar or identical gate circuits may be employed to perform both functions by merely changing the voltage biasing on the diodes. Consequently in the combined circuits of FIG. 7, it is intended that additional switches (not shown) will be supplied internally in the gate circuits 146, 147, 148 and 149, and preferably ganged together and with the switches 135, 155, 157 and 163 so that the gates are correctly switched for either encoder or decoder operation, as desired.

Although but preferred embodiments of the invention have been illustrated and described, many changes may be made by those skilled in the art without departing from the spirit and scope of this invention. Accordingly, this invention should be considered as being limited only according to the following claims.

What is claimed is:

1. A decoding system comprising an analog voltage generator having a series of input lines and an output line with each input line being individually energizable to add a preselected increment of analog voltage to the output line, a multisection delay line having a series of equal delay line sections corresponding to the number of digits to be decoded, gating means interconnecting each section of the delay line to a different input line of the generator, conductor means for applying a serially received digital code of pulses to the multisection delay line, and means responsive to the first of digital code of pulses traversing all of said delay line sections to simultaneously close said gate circuits.

2. An analog to digital converter comprising:
a multisection passive delay line,
a series of gate circuits,
a step wave generator having a plurality of individual energizable input lines and an output line,
each of said gate circuits interconnecting a different section of the delay line with a different input of the step wave generator,
a voltage amplitude comparator responsive to the output of said step wave generator and to an analog signal to produce a signal when the step wave output exceeds the analog signal,
means interconnecting the comparator to the gate circuits,
means for applying an actuating pulse to the multisection delay line,
and means responsive to the actuating pulse traversing all sections of the passive delay line to reset the step wave generator.

3. A converter for reversibly converting analog-to-digital data comprising:
a multisection passive time delay means having a plurality of outputs each progressively time delayed from its preceding output,
a plurality of differentiating circuits each energized by a different output of the delay means,
a plurality of gate circuits,
a step wave generator having a plurality of individually energizable input lines each being interconnected by a different one of the differentiating circuits,
and a voltage level comparator circuit energizable by said step wave generator and by an analog signal,
means selectively interconnecting said converter for digital-to-analog conversion comprising:
means for connecting said time delay means to receive a serial pulse code, means for selectively connecting all of said gate circuits to the last of the said time delay outputs, and means for interconnecting said step wave generator to be reset by an external reset pulse,
means selectively connecting said converter to analog to digital conversion comprising:
means for selectively connecting said time delay means to receive a clock pulse, means for selectively connecting said gate circuits to be energized by said comparator, and means for selectively connecting said step wave generator to be reset by the last of said time delay outputs.

4. In a data converter,
a plurality of delay lines interconnected in cascade,
a plurality of differentiator circuits,
a plurality of gate circuits,
a step wave generator having a plurality of individually energizable input lines, each input line being connected by means of a different one of the gate circuits and a different one of differentiator circuits to a different one of the delay lines,
means interconnecting said converter for digital to analog operation comprising: means interconnecting the last of said delay lines to close all of said gates simultaneously, and means for applying a digital pulse code to the first delay line.

5. In the converter of claim 4,
a voltage amplitude comparator,
and means interconnecting said converter for analog-to-digital operation comprising: means for applying a clock pulse to the first delay line, means for applying an analog signal and a signal from the step wave generator to the comparator,
means interconnecting said comparator to close said gates, and means interconnecting the last of said delay lines to reset said step wave generator.

6. In a decoder for digital to analog conversion of data,
means for resolving a serially received pulse code into a series of simultaneous impulses over separate channels corresponding to the different digital orders of the code,
said resolving means comprising a delay line having a plurality of outputs each equally and progressively time delayed from the preceding output, a plurality of gate circuits, with each gate circuit being connected to switch a different output of the delay line,
means for applying said serial pulse code to the delay line, and means interconnecting said delay line to simultaneously actuate said gates when all of the pulses of the serial code simultaneously appear at a different output line of the delay line.

7. In an encoder for analog-to-digital conversion of data,
means for directing an impulse to sequentially energize a series of lines and initiate the production of a series of different level analog signals in time delayed sequence,
said means comprising a delay line having a series of output lines, and means for applying said pulse to the delay line,
a gate circuit for each line,
a pulse splitter circuit for each line disposed before the gate circuit for that line,
said gate circuit being normally closed for the passage of pulses of one polarity and normally open to prevent the passage of pulses of the opposite polarity,
each of said pulse splitter circuits responsive to the pulses from its associated output line of the time delay line for producing a pair of opposite polarity pulses in time delay relationship, and each of said gate circuits normally passing the first of said split pulses and normally impeding the second of said split pulse,
a switch energized by each gate and responsive to said first split pulse to actuate an output and responsive to the second split pulse to deactuate the said output,
and means for selectively energizing said gate circuits in succession to produce a given code of actuated and deactuated output circuits responsively to each pulse applied to the delay line.

8. In the encoder of claim 7, said means for selectively energizing said gate circuits in succession including a voltage amplitude comparator circuit, said outputs comprising means for producing different fixed amplitude voltages, and said comparator responsive to said outputs and to an analog input signal to energize, said gates whenever the fixed amplitude voltages exceed the amplitude of said analog input signal.

9. In a sequential to parallel converter, a plurality of equal passive delay line sections interconnected in series and having a plurality of outputs equally time delayed from each other, means for applying a serial pulse code to the delay line, and switching means energized by the first pulse of said code and responsive to the individual pulses of the code appearing simultaneously at different ones of the output lines of the delay line to simultaneously interconnect all of the output lines to a utilization circuit.

10. A sequentially operating actuator for enabling a series of decisions to be made comprising:

a delay line having a series of time delayed outputs, a differentiating circuit for each output and producing a first and second time delay impulse of opposite polarity for each energization of the differentiating circuit, a polarity response gate means for each differentiating circuit and passing the first impulse of the differentiating circuit and gating the second impulse of opposite polarity, means for applying an initiating pulse to the delay line which appears at each output line thereof in succession and energizes the differentiating circuit thereof, and a decision making means energized by the first impulse passed by each gate and producing a control signal for an incorrect decision, and means interconnecting the control signal in feedback to energize said gate, thereby to pass the second impulse through the gate responsively to an incorrect decision.

References Cited by the Examiner

UNITED STATES PATENTS

| | | | |
|---|---|---|---|
| 2,505,029 | 4/1950 | Carbrey | 340—237 |
| 2,950,348 | 8/1960 | Mayer | 340—347 |
| 3,030,614 | 4/1962 | Lehan et al. | 340—347 |
| 3,098,224 | 7/1963 | Hoffman | 340—347 |
| 3,167,757 | 1/1965 | D'Aquila | 340—347 |

MAYNARD R. WILBUR, *Primary Examiner.*

MALCOLM A. MORRISON, DARYL W. COOK, *Examiners.*

R. C. BAILEY, W. J. KOPACZ, *Assistant Examiners.*